United States Patent
Glass et al.

(10) Patent No.: US 9,438,611 B2
(45) Date of Patent: Sep. 6, 2016

(54) MANAGING A BLOCKED-ORIGINATOR LIST FOR A MESSAGING APPLICATION

(71) Applicant: LENOVO ENTERPRISE SOLUTIONS (SINGAPORE) PTE. LTD., Singapore (SG)

(72) Inventors: David W. Glass, Georgetown, KY (US); James G. McLean, Fuquay-Varina, NC (US); Clifford A. Pickover, Yorktown Heights, NY (US); Daniel J. Winarski, Tucson, AZ (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 159 days.

(21) Appl. No.: 14/215,541

(22) Filed: Mar. 17, 2014

(65) Prior Publication Data

US 2015/0264066 A1 Sep. 17, 2015

(51) Int. Cl.
*H04L 29/06* (2006.01)
*H04L 12/58* (2006.01)

(52) U.S. Cl.
CPC ......... *H04L 63/1416* (2013.01); *H04L 51/046* (2013.01); *H04L 51/12* (2013.01); *H04L 63/101* (2013.01)

(58) Field of Classification Search
CPC ................................................. H04L 63/1416
USPC .......................................................... 726/23
See application file for complete search history.

(56) References Cited

U.S. PATENT DOCUMENTS

| | | | |
|---|---|---|---|
| 7,574,476 B2 | 8/2009 | Dorricott | |
| 8,042,178 B1 * | 10/2011 | Fisher | G06F 21/554 726/22 |
| 8,301,703 B2 | 10/2012 | Boss et al. | |
| 8,301,767 B1 | 10/2012 | Davis et al. | |
| 8,332,947 B1 * | 12/2012 | Bregman | G06F 21/577 726/25 |
| 8,914,406 B1 * | 12/2014 | Haugsnes | H04L 63/1441 382/305 |
| 8,990,312 B2 * | 3/2015 | Wilson | G06Q 10/107 709/206 |

(Continued)

FOREIGN PATENT DOCUMENTS

WO    WO 2005/066826 A1    7/2005

OTHER PUBLICATIONS

Simmons et al., "CCF : The Common Communication Format Second Edition", 1988.*

(Continued)

*Primary Examiner* — O. C. Vostal
(74) *Attorney, Agent, or Firm* — Brandon C. Kennedy; Katherine S. Brown; Kennedy Lenart Spraggins LLP (57) ABSTRACT

Managing a blocked-originator list for a messaging application, including: detecting, by a list management module, a list management initiation event for a blocked-originator list, the blocked-originator list including a plurality of originators from which incoming messages are blocked; determining a number of entries in a blocked-originator list; determining a maximum number of entries in the blocked-originator list; determining whether the number of entries in the blocked-originator list is equal to the maximum number of entries in the blocked-originator list; and responsive to determining that the number of entries in the blocked-originator list is equal to the maximum number of entries in the blocked-originator list: deleting an entry from the blocked-originator list in dependence upon entry removal rules; and adding the new entry to the blocked-originator list.

12 Claims, 5 Drawing Sheets

(56) References Cited

U.S. PATENT DOCUMENTS

| | | | | |
|---|---|---|---|---|
| 2003/0037114 | A1* | 2/2003 | Nishio | H04L 51/28 709/206 |
| 2003/0065943 | A1* | 4/2003 | Geis | H04L 63/1458 726/4 |
| 2003/0163540 | A1* | 8/2003 | Dorricott | G06Q 10/107 709/206 |
| 2003/0182379 | A1* | 9/2003 | Henry | H04L 51/28 709/206 |
| 2004/0044912 | A1* | 3/2004 | Connary | H04L 43/045 726/23 |
| 2004/0054741 | A1 | 3/2004 | Weatherby et al. | |
| 2004/0215721 | A1* | 10/2004 | Szeto | H04L 12/58 709/204 |
| 2005/0131888 | A1* | 6/2005 | Tafoya | G06Q 10/107 |
| 2005/0175021 | A1* | 8/2005 | Ozugur | H04L 12/581 370/401 |
| 2006/0271631 | A1* | 11/2006 | Qureshi | H04L 51/12 709/206 |
| 2008/0092242 | A1* | 4/2008 | Rowley | H04L 63/1483 726/27 |
| 2008/0168145 | A1 | 7/2008 | Wilson | |
| 2008/0244009 | A1* | 10/2008 | Rand | G06Q 10/107 709/206 |
| 2009/0044006 | A1* | 2/2009 | Shim | G06Q 10/107 713/151 |
| 2009/0110275 | A1* | 4/2009 | Ahmed | G06F 17/30707 382/170 |
| 2010/0174788 | A1* | 7/2010 | Vitaldevara | G06Q 10/107 709/206 |
| 2011/0314559 | A1* | 12/2011 | Jakobsson | G06F 21/36 726/28 |
| 2012/0124664 | A1* | 5/2012 | Stein | G06F 15/16 726/22 |
| 2012/0204265 | A1* | 8/2012 | Judge | G06F 21/554 726/24 |
| 2013/0054477 | A1* | 2/2013 | Steele | G06Q 30/00 705/310 |
| 2014/0089306 | A1* | 3/2014 | Rana | G06F 17/30554 707/731 |
| 2014/0331318 | A1* | 11/2014 | Windsor | H04L 63/1441 726/22 |
| 2015/0026464 | A1* | 1/2015 | Hanner, Sr. | H04L 63/1416 713/168 |
| 2015/0135262 | A1* | 5/2015 | Porat | G06F 21/552 726/1 |
| 2015/0180892 | A1* | 6/2015 | Balderas | H04L 63/1416 726/11 |

OTHER PUBLICATIONS

Barbir et al., "Security Threats and Risks for Open Pluggable Edge Services (OPES)", RFC 3837, 2004.*

Moustafa et al., "Security Threats and Security Requirements for the Access Node Control Protocol (ANCP)", RFC 5713, 2010.*

Internet Society, et al., "DNS Blacklists and Whitelists", IP.com Prior Art Database Technical Disclosure, IP.com (electronic publication), Feb. 19, 2010, pp. 1-23, IP.com No. IPCOM000193352D.

Anonymous, "Multi-Radio Access Technology Black-List", IP.com Prior Art Database Technical Disclosure, IP.com (electronic publication), Dec. 5, 2008, pp. 1-2, IP.com No. IPCOM000177228D.

Angotti, "Gmail Spam Filtering Explained: Actionable Advice for Email Marketers", SearchEngineJournal.com (electronic publication), Mar. 20, 2012, pp. 1-6, URL: http://www.searchenginejournal.com/gmail-spam-filtering/41632/.

Panda Security, "Glossary of Technical Terms About Computer Viruses and Antivirus", PandaSecurityUSA.com (electronic publication), accessed Sep. 26, 2013, 1 page, URL: http://www.pandasecurity.com/homeusers/security-info/glossary/#PELIGROSIDAD.

Wikipedia, "DNSBL", en.wikipedia.org (online publication), accessed Sep. 26, 2013, 8 pages, URL: http://en.wikipedia.org/wiki/DNSBL.

Whittington, "How to Prune Your E-Mail List and Reduce Abuse Complaints in MailChimp", rickwhittington.com (online publication), accessed Sep. 26, 2013, 5 pages, Rick Whittington Consuting, URL: http://www.rickwhittington.com/blog/prune-email-list-in-mailchimp/.

Kipedia, "Threat model", en.wikipedia.org (online publication), accessed Sep. 26, 2013, 4 pages, URL: http://en.wikipedia.org/wiki/Threat_model.

SpamCop.net, "SpamCop FAQ: What is the SpamCop Blocking List (SCBL)?", spamcop.net (online publication), accessed Sep. 26, 2013, 4 pages, Cisco Systems, Inc., URL: http://www.spamcop.net/fom-serve/cache/297.html.

* cited by examiner

MANAGING A BLOCKED-ORIGINATOR LIST FOR A MESSAGING APPLICATION

BACKGROUND OF THE INVENTION

1. Field of the Invention

The field of the invention is data processing, or, more specifically, methods, apparatuses, and products for managing a blocked-originator list for a messaging application.

2. Description of Related Art

Modern electronic mail ('email') systems can incorporate a blocked-address list, which is used to prevent the delivery or the display of messages from certain originating email addresses. Such originating email addresses may be used by originators of spam, phishing schemes, or other malicious mail. Such blocked-address lists, however, may be limited in size such that only a limited number of entries may be included in the blocked-address list. In situations in which a blocked-address list is full and an additional entry needs to be added to the blocked-address list, the existing solution is for the user of the messaging application to manually scan a list of blocked email addresses and delete some email addresses from the blocked-address list in order to make room for new email addresses. Such a solution is not optimal as it wastes the user's time and may result in the user allowing delivery of more malicious email messages than those that the user was attempting to block.

SUMMARY OF THE INVENTION

Methods, apparatuses, and products for managing a blocked-originator list for a messaging application, including: detecting, by a list management module, a list management initiation event for a blocked-originator list, the blocked-originator list including a plurality of originators from which incoming messages are blocked; determining a number of entries in a blocked-originator list; determining a maximum number of entries in the blocked-originator list; determining whether the number of entries in the blocked-originator list is equal to the maximum number of entries in the blocked-originator list; and responsive to determining that the number of entries in the blocked-originator list is equal to the maximum number of entries in the blocked-originator list: deleting an entry from the blocked-originator list in dependence upon entry removal rules; and adding the new entry to the blocked-originator list.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
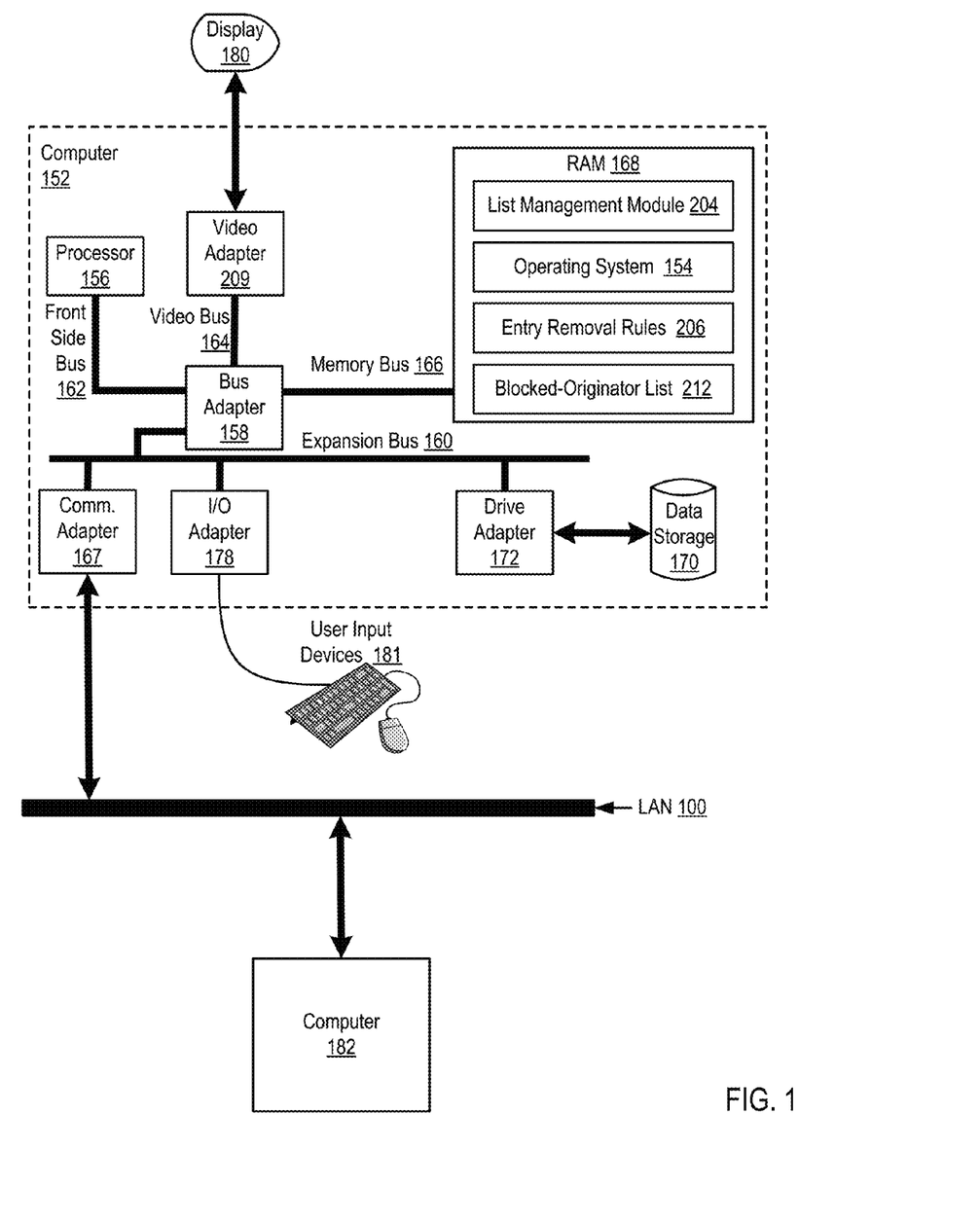
FIG. 1 sets forth a block diagram of automated computing machinery comprising an example computer useful in managing a blocked-originator list for a messaging application according to embodiments of the present invention.

Example methods, apparatuses, and products for managing a blocked-originator list for a messaging application in accordance with the present invention are described with reference to the accompanying drawings, beginning with FIG. 1. FIG. 1 sets forth a block diagram of automated computing machinery comprising an example computer (152) useful in managing a blocked-originator list for a messaging application according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a list management module (204), a module of computer program instructions for managing a blocked-originator list (212) for a messaging application according to embodiments of the present invention. A messaging application may be embodied, for example, as an electronic mail ('email') client such as Microsoft Outlook™, Lotus Notes™, and so on. Such a messaging application may be configured to receive messages from a designated originator of the message. For example, the messaging application may be configured to receive an email message from a sender that is identified by a particular email address (e.g., sender@mailhost.com). In such an example, the messaging application may make use of a blocked-originator list (212) that includes a plurality of originators from which incoming messages are blocked. Incoming messages may be blocked, for example, because the incoming message is spam, because the incoming message is part of a phishing scheme, or because the incoming message is originated by an otherwise untrusted source. In such an example, the originators in the blocked-originator list (212) represent originators of messages that are untrusted, and as such, messages originated from originators in the blocked-originator list (212) should be discarded and blocked from delivery to a user of the messaging application.

Although the blocked-originator list (212) of FIG. 1 is described here as being a 'list,' readers will appreciate that the blocked-originator list (212) may be embodied in a variety of ways. For example, the blocked-originator list (212) may be embodied as a table, a database, a linked list, an array, a vector, or other appropriate data structure. Likewise, each entry in the blocked-originator list (212) may be embodied as a structure or other special purpose data structure. Such a special purpose data structure can include a variety of fields including, for example, the name of the originator of unwanted messages, the email address of the originator of unwanted messages, the threat level posed by the unwanted messages received from a particular originator, the time at which a particular entry was added to the blocked-originator list (212), a counter for identifying the number of unwanted messages received from a particular originator, and so on.

The list management module (204) of FIG. 1 may be embodied, for example, as computer program instructions executing on computer hardware such as a computer processor (156). The list management module (204) of FIG. 1 may be embodied as a module within the messaging application, as a plug-in to the messaging application, as a stand-alone module that communicates with the messaging application, and so on. The list management module (204) of FIG. 1 may be configured to manage a blocked-originator list (212) for a messaging application by detecting a list management initiation event for the blocked-originator list (212). The list management initiation event can include any predetermined event that, upon the occurrence of such an event, causes the list management module (204) to carry out one or more list management operations, including the list management operations described in greater detail below with reference to FIGS. 2-5.

The list management module (204) of FIG. 1 is further configured to manage a blocked-originator list (212) for a messaging application by determining a number of entries in a blocked-originator list (212). Determining the number of entries in the blocked-originator list (212) may be carried out, for example, by inspecting a value contained in a special purpose counter that is incremented each time an entry is added to the blocked-originator list (212) and also decremented each time an entry is removed from the blocked-originator list (212). In such an example, the counter may be embodied as an integer value specially allocated for the purpose of tracking the number of entries in the blocked-originator list (212). In alternative embodiments, determining the number of entries in the blocked-originator list (212) may be carried out, for example, through the use of functions designed to identify the numbers of entries in a database or other data structure.

The list management module (204) of FIG. 1 is further configured to manage a blocked-originator list (212) for a messaging application by determining a maximum number of entries that may be included in the blocked-originator list (212). Determining the maximum number of entries that may be included in the blocked-originator list (212) may be carried out, for example, by examining the value contained in a variable that is configured during system initialization to contain maximum number of entries in the blocked-originator list (212), by dividing the amount of memory allocated for the blocked-originator list (212) by the size of each entry in the blocked-originator list (212), by receiving the maximum number of entries in the blocked-originator list (212) from a system administrator, and so on.

The list management module (204) of FIG. 1 is further configured to manage a blocked-originator list (212) for a messaging application by determining whether the number of entries currently contained in the blocked-originator list (212) is equal to the maximum number of entries allowed to be included in the blocked-originator list (212). Determining whether the number of entries currently in the blocked-originator list (212) is equal to the maximum number of entries allowed to be in the blocked-originator list (212) may be carried out, for example, by comparing the number of entries currently in the blocked-originator list (212) to the maximum number of entries allowed to be included in the blocked-originator list (212).

The list management module (204) of FIG. 1 is further configured to manage a blocked-originator list (212) for a messaging application by deleting an entry from the blocked-originator list (212) in dependence upon entry removal rules (206). The entry removal rules (206) of FIG. 1 represent rules that are used to identify the specific entry in the blocked-originator list (212) that is to be removed, thereby freeing up an entry in the blocked-originator list (212), such that a new entry can be added to the blocked-originator list (212). Such entry removal rules (206) may be configured, for example, to identify the entry in the blocked-originator list (212) that identifies an originator from which unwanted messages were least recently received, to identify the entry in the blocked-originator list (212) that identifies an originator from which unwanted messages were least frequently received, to identify the entry in the blocked-originator list (212) that identifies an originator from which unwanted messages with a lowest predetermined threat level were received, and so on. Deleting an entry from the blocked-originator list (212) in dependence upon entry removal rules (206) may be carried out in response to affirmatively determining that the number of entries in the blocked-originator list (212) is equal to the maximum number of entries in the blocked-originator list (212).

The list management module (204) of FIG. 1 is further configured to manage a blocked-originator list (212) for a messaging application by adding the new entry to the blocked-originator list (212). Adding the new entry to the blocked-originator list (212) may be carried out, for example, by inserting the new entry into the slot in the blocked-originator list (212) from which an entry was previously deleted, by inserting the new entry at tail of the blocked-originator list (212), by inserting the new entry at the head of the blocked-originator list (212), and so on. Adding the new entry to the blocked-originator list (212) may also be carried out in response to affirmatively determining that the number of entries in the blocked-originator list (212) is equal to the maximum number of entries in the blocked-originator list (212).

Also stored in RAM (168) is an operating system (154). Operating systems useful managing a blocked-originator list for a messaging application according to embodiments of the present invention include UNIX™, Linux™, Microsoft XP™, AIX™, IBM's i5/OS™, and others as will occur to those of skill in the art. The operating system (154), list management module (204), the blocked-originator list (212), and entry removal rules (206) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for managing a blocked-originator list for a messaging application according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for managing a blocked-originator list for a messaging application according to embodiments of the present invention include modems for wired dial-up communications, Ethernet (IEEE 802.3) adapters for wired data communications network communications, and 802.11 adapters for wireless data communications network communications.

Figure 2:
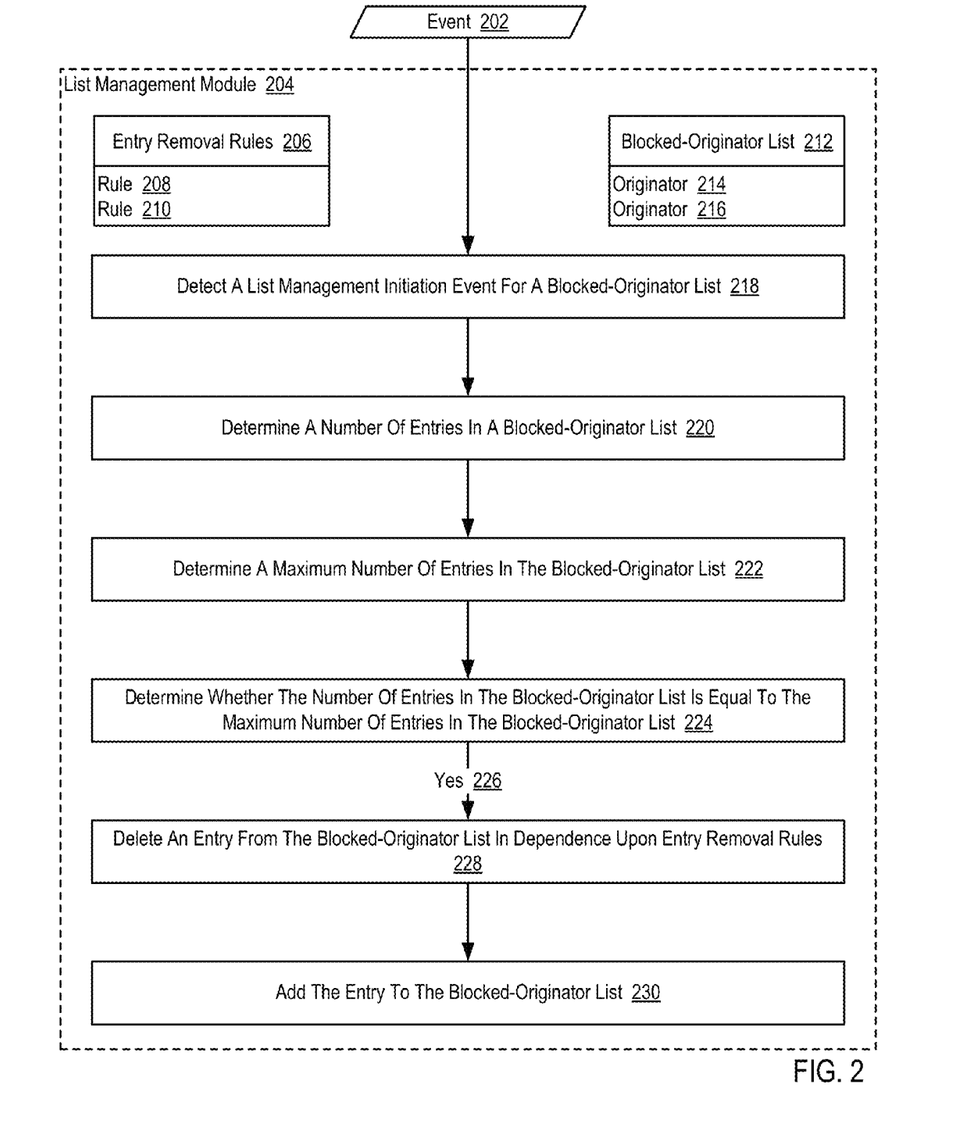
FIG. 2 sets forth a flow chart illustrating an example method for managing a blocked-originator list in a messaging application according to embodiments of the present invention.

For further explanation, FIG. 2 sets forth a flow chart illustrating an example method for managing a blocked-originator list (212) for a messaging application according to embodiments of the present invention. A messaging application may be embodied, for example, as an email client such as Microsoft Outlook™, Lotus Notes™, and so on. Such a messaging application may be configured to receive messages from a designated originator of the message. For example, the messaging application may be configured to receive an email message from a sender that is identified by a particular email address (e.g., sender@mailhost.com). In such an example, the messaging application may make use of a blocked-originator list (212) that includes a plurality of originators (214, 216) from which incoming messages are blocked. Incoming messages may be blocked, for example, because the incoming message is spam, because the incoming message is part of a phishing scheme, or because the incoming message is originated by an otherwise untrusted source. In such an example, the originators (214, 216) in the blocked-originator list (212) represent originators of messages that are untrusted, and as such, messages originated from originators (214, 216) in the blocked-originator list (212) should be discarded and blocked from delivery to a user of the messaging application.

Although the blocked-originator list (212) of FIG. 2 is described here as being a 'list,' readers will appreciate that the blocked-originator list (212) may be embodied in a variety of ways. For example, the blocked-originator list (212) may be embodied as a table, a database, a linked list, an array, a vector, or other appropriate data structure. Likewise, each entry in the blocked-originator list (212) may be embodied as a structure or other special purpose data structure. Such a special purpose data structure can include a variety of fields including, for example, the name of the originator of unwanted messages, the email address of the originator of unwanted messages, the threat level posed by the unwanted messages received from a particular originator, the time at which a particular entry was added to the blocked-originator list (212), a counter for identifying the number of unwanted messages received from a particular originator, and so on.

The example method depicted in FIG. 2 is carried out, at least in part, by a list management module (204). The list management module (204) of FIG. 2 may be embodied, for example, as computer program instructions executing on computer hardware such as a computer processor. The list management module (204) of FIG. 2 may be embodied as a module within the messaging application, as a plug-in to the messaging application, as a stand-alone module that communicates with the messaging application, and so on. Although the list management module (204) of FIG. 2 is depicted as including the blocked-originator list (212) and entry removal rules (206), readers will appreciate that the blocked-originator list (212) and entry removal rules (206) may be stored in computer memory that is separate from the list management module (204) but is otherwise accessible by the list management module (204).

The example method depicted in FIG. 2 includes detecting (218), by a list management module (204), a list management initiation event (202) for a blocked-originator list (212). The list management initiation event (202) of FIG. 2 can include any predetermined event that, upon the occurrence of such an event, causes the list management module (204) to carry out one or more list management operations, including the list management operations described in steps 220, 222, 224, 226, 228, and 230 of FIG. 2.

In one embodiment, the list management initiation event (202) may be embodied as a user-initiated event. For example, the list management initiation event (202) may be embodied as a user-initiated request to add a new entry to a blocked-originator list (212), as a user-initiated request to perform list management operations, and so on. Such a user-initiated request may be initiated by the user of the messaging application through a GUI that is presented to the user via the messaging application. For example, the user may press a button on the GUI in order to generate a user-initiated request to perform list management operations. Alternatively, the user of the messaging application may receive an unwanted message from a particular email originator and subsequently attempt to add the particular email originator to a list of blocked email originators. The request to add a new entry to a blocked-originator list (212) may include, for example, information identifying the originator that is to be added to the blocked-originator list (212) such as the originator's email address, the IP address from which unwanted messages are originated by the originator, the originator's name, and so on.

In alternative embodiments, the list management initiation event (202) may be embodied as an event that is not user-initiated. For example, the list management module (204) may be configured to perform list management operations upon the expiration of a predetermined interval of time, such that the expiration of the predetermined interval of time is the list management initiation event (202). Alternatively, the list management module (204) may be configured to perform list management operations according to a predetermined schedule, such that the occurrence of a particular date or time is the list management initiation event (202). Furthermore, the list management initiation event (202) can be embodied, for example, as a device that includes the list management module (204) detecting that the device has connected or reconnected to a particular host server, as the device that includes the list management module (204) detecting that the utilization of certain device resources has dropped below a predetermined threshold, and so on.

The example method depicted in FIG. 2 also includes determining (220), by the list management module (204), a number of entries currently in the blocked-originator list (212). Determining (220) the number of entries in the blocked-originator list (212) may be carried out, for example, by inspecting a value contained in a special purpose counter that is incremented each time an entry is added to the blocked-originator list (212) and also decremented each time an entry is removed from the blocked-originator list (212). In such an example, the counter may be embodied as an integer value specially allocated for the purpose of tracking the number of entries in the blocked-originator list (212). In alternative embodiments, determining (220) the number of entries in the blocked-originator list (212) may be carried out, for example, through the use of functions designed to identify the numbers of entries in a database or other data structure.

The example method depicted in FIG. 2 also includes determining (222), by the list management module (204), a maximum number of entries that may be included in the blocked-originator list (212). Determining (222) the maximum number of entries that may be included in the blocked-originator list (212) may be carried out, for example, by examining the value contained in a variable that is configured during system initialization to contain maximum number of entries in the blocked-originator list (212), by dividing the amount of memory allocated for the blocked-originator list (212) by the size of each entry in the blocked-originator list (212), by receiving the maximum number of entries in the blocked-originator list (212) from a system administrator, and so on.

The example method depicted in FIG. 2 also includes determining (224), by the list management module (204), whether the number of entries currently in the blocked-originator list (212) is equal to the maximum number of entries that may be included in the blocked-originator list (212). Determining (224) whether the number of entries currently in the blocked-originator list (212) is equal to the maximum number of entries that may be included in the blocked-originator list (212) may be carried out, for example, by comparing the number of entries currently in the blocked-originator list (212) to the maximum number of entries that may be included in the blocked-originator list (212).

The example method depicted in FIG. 2 also includes deleting (228), by the list management module (204), an entry from the blocked-originator list (212) in dependence upon entry removal rules (206). The entry removal rules (206) of FIG. 2 represent rules that are used to identify the specific entry in the blocked-originator list (212) that is to be removed, thereby freeing up an entry in the blocked-originator list (212), such that a new entry can be added to the blocked-originator list (212). Such entry removal rules (206) may be configured, for example, to identify the entry in the blocked-originator list (212) that identifies an originator from which one or more unwanted messages were least recently received, to identify the entry in the blocked-originator list (212) that identifies an originator from which one or more unwanted messages were least frequently received, to identify the entry in the blocked-originator list (212) that identifies an originator from which unwanted messages with an lowest predetermined threat level were received, and so on. In the example method depicted in FIG. 2, deleting (228) an entry from the blocked-originator list (212) in dependence upon entry removal rules (206) may be carried out in response to affirmatively (226) determining that the number of entries currently in the blocked-originator list (212) is equal to the maximum number of entries that may be included in the blocked-originator list (212).

The example method depicted in FIG. 2 also includes adding (230), by the list management module (204), the new entry to the blocked-originator list (212). Adding (230) the new entry to the blocked-originator list (212) may be carried out, for example, by inserting the new entry into the slot in the blocked-originator list (212) from which an entry was previously deleted (228), by inserting the new entry at tail of the blocked-originator list (212), by inserting the new entry at the head of the blocked-originator list (212), and so on. In the example method of FIG. 2, adding (230) the new entry to the blocked-originator list (212) may also be carried out in response to affirmatively (226) determining that the number of entries in the blocked-originator list (212) is equal to the maximum number of entries in the blocked-originator list (212).

Figure 3:
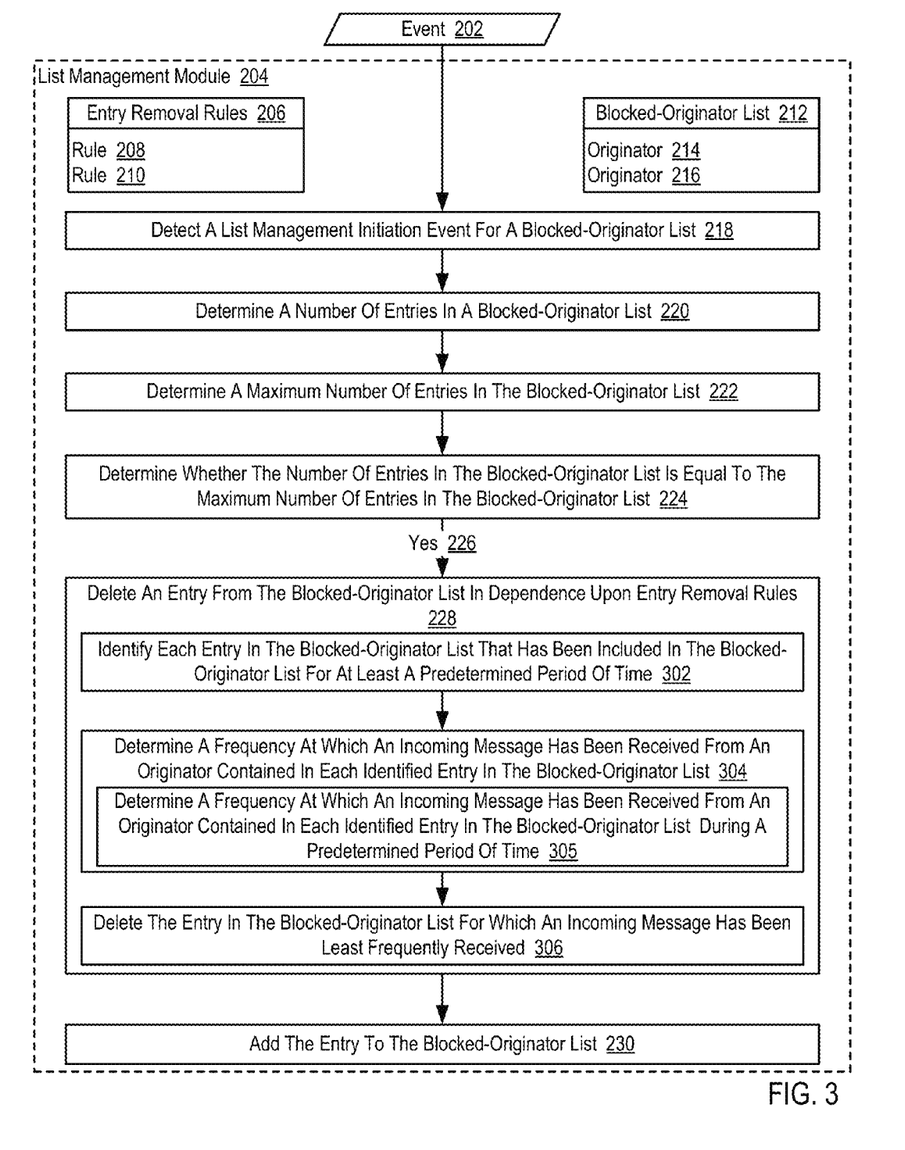
FIG. 3 sets forth a flow chart illustrating an additional example method for managing a blocked-originator list in a messaging application according to embodiments of the present invention.

For further explanation, FIG. 3 sets forth a flow chart illustrating an additional example method for managing a blocked-originator list (212) in a messaging application according to embodiments of the present invention. The example method depicted in FIG. 3 is similar to the example method depicted in FIG. 2, as it also includes detecting (218) a list management initiation event (202) for a blocked-originator list (212), determining (220) a number of entries in a blocked-originator list (212), determining (222) a maximum number of entries in the blocked-originator list (212), determining (224) whether the number of entries in the blocked-originator list (212) is equal to the maximum number of entries in the blocked-originator list (212), deleting (228) an entry from the blocked-originator list (212) in dependence upon entry removal rules (206), and adding (230) the new entry to the blocked-originator list (212).

In the example method depicted in FIG. 3, deleting (228) an entry from the blocked-originator list (212) in dependence upon entry removal rules (206) can include identifying (302), by the list management module (204), each entry in the blocked-originator list (212) that has been included in the blocked-originator list (212) for at least a predetermined period of time. In the example method of FIG. 3, the list management module (204) may maintain information identifying the time at which each entry in the blocked-originator list (212) was added to the blocked-originator list (212). Such information may be embodied, for example, as a timestamp that includes the date and time that the entry was added to the blocked-originator list (212), a relative value that identifies how long a particular entry has been in the blocked-originator list (212) relative to other entries in the blocked-originator list (212), a value representing the length of time that a particular entry has been in the blocked-originator list (212), and so on. In such an example, the information identifying the time at which each entry in the blocked-originator list (212) was added to the blocked-originator list (212) may be compared to a predetermined period of time, such that only those entries in the blocked-originator list (212) that have been included in the blocked-originator list (212) for a period of time that exceeds the predetermined period of time may be candidates for removal from the blocked-originator list (212).

In the example method depicted in FIG. 3, deleting (228) an entry from the blocked-originator list (212) in dependence upon entry removal rules (206) can also include determining (304), by the list management module (204), a frequency at which one or more incoming messages have been received from an originator contained in each identified entry in the blocked-originator list (212). In the example method of FIG. 3, determining (304) the frequency at which one or more incoming messages have been received from an originator contained in each identified entry in the blocked-originator list (212) may be carried out by dividing the number of incoming messages that have been received from an originator (214, 216) contained in a particular entry in the blocked-originator list (212) by the amount of time that the particular entry has been included in the blocked-originator list (212). In the example method depicted in FIG. 3, determining (304) a frequency at which an incoming message has been received from an originator contained in each identified entry in the blocked-originator list (212) may include determining (305), by the list management module (204), a frequency at which an incoming message has been received from an originator (214, 216) contained in each identified entry in the blocked-originator list (212) during a predetermined period of time.

Consider an example in which a large number of unwanted messages are received within a short period of time from a particular originator. Assume that in such an example, after an initial burst of unwanted messages are received from the particular originator, no additional unwanted messages are ever received from the particular originator. In such an example, the large number of unwanted messages that were initially received from the particular originator may cause the calculated frequency of received messages from that originator to remain relatively high, in spite of the fact that unwanted messages are no longer being received from the originator. In order to prevent entries from remaining in the blocked-originator list (212) solely by virtue of a large burst of initial activity, the time period for which a frequency is calculated may be restricted to a predetermined period of time. For example, the time period for which a frequency is calculated may be restricted to the last 30 days, restricted to 30 days after a particular entry was added to the blocked-originator list (212), and so on.

Readers will appreciate that while in one embodiment the frequency at which an incoming message has been received from a particular originator may be determined (305) during a predetermined period of time, other embodiments are contemplated in which entries are prevented from remaining in the blocked-originator list (212) solely by virtue of a large burst of initial activity. For example, in an alternative embodiment, older unwanted messages that were received from a particular originator may be given less weighting in a frequency calculation as newer unwanted messages that were received from a particular originator.

In the example method depicted in FIG. 3, deleting (228) an entry from the blocked-originator list (212) in dependence upon entry removal rules (206) can also include deleting (306), by the list management module (204), the entry in the blocked-originator list (212) for which incoming messages have been least frequently received. In such a way, the list management module (204) can ensure that the blocked-originator list (212) includes entries that are used to block incoming messages from those originators that most frequently originate unwanted messages, thereby also causing stale entries in the blocked-originator list (212) to be deleted (228).

Figure 4:
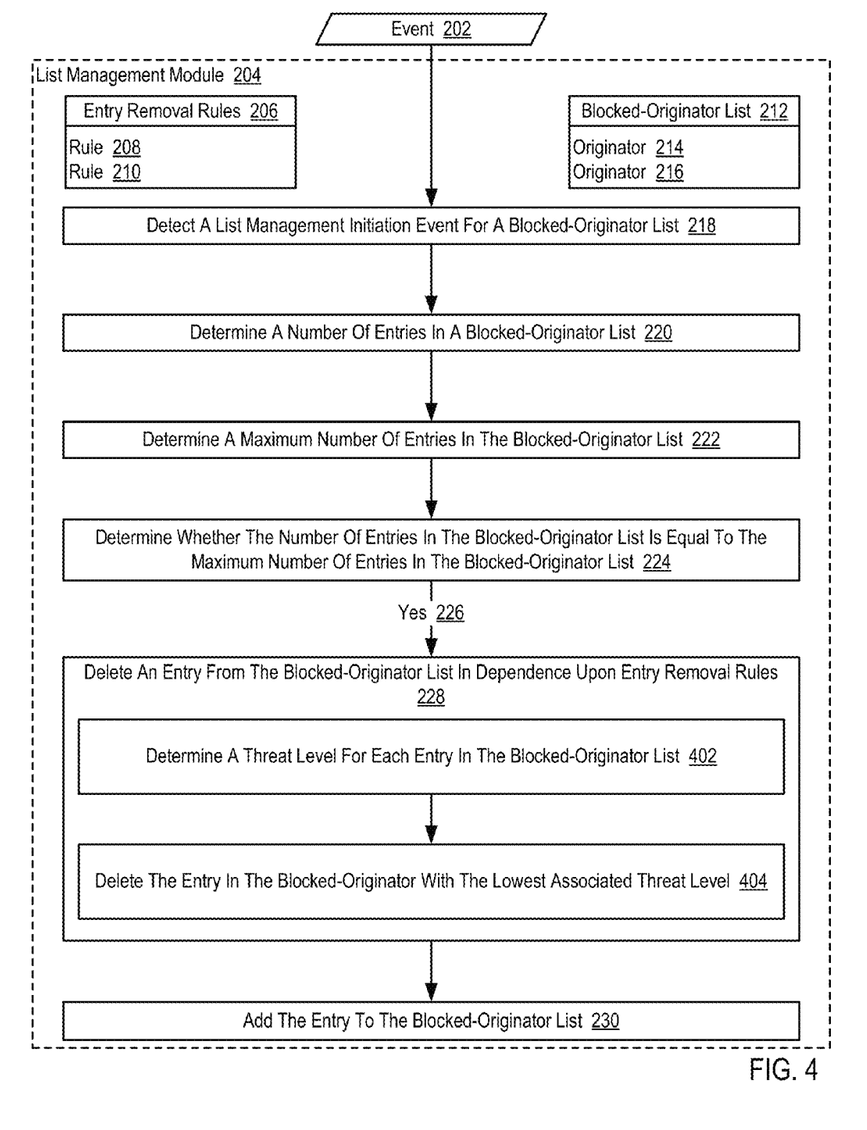
FIG. 4 sets forth a flow chart illustrating an additional example method for managing a blocked-originator list in a messaging application according to embodiments of the present invention.

For further explanation, FIG. 4 sets forth a flow chart illustrating an additional example method for managing a blocked-originator list (212) in a messaging application according to embodiments of the present invention. The example method depicted in FIG. 4 is similar to the example method depicted in FIG. 2, as it also includes detecting (218) a list management initiation event (202) for a blocked-originator list (212), determining (220) a number of entries in a blocked-originator list (212), determining (222) a maximum number of entries in the blocked-originator list (212), determining (224) whether the number of entries in the blocked-originator list (212) is equal to the maximum number of entries in the blocked-originator list (212), deleting (228) an entry from the blocked-originator list (212) in dependence upon entry removal rules (206), and adding (230) the new entry to the blocked-originator list (212).

In the example method depicted in FIG. 4, deleting (228) an entry from the blocked-originator list (212) in dependence upon entry removal rules (206) can include determining (402), by the list management module (204), a threat level for each entry in the blocked-originator list (212). The threat level for each entry in the blocked-originator list (212) represents the extent to which unwanted messages from an originator (214, 216) associated with a particular entry in the blocked-originator list (212) pose a threat to the computing system or user receiving the unwanted messages. For example, an unwanted message from a first originator (214) that includes a virus or malware may pose a greater threat that an unwanted message from a second originator (216) that includes advertising information. In such an example, the threat level associated with the entry for the first originator (214) would be higher than the threat level associated with the entry for the second originator (216). The threat level associated with each entry in the blocked-originator list (212) may be evaluated, for example, manually by a user, automatically by a third-party security application, and so on. In such an example, the threat level associated with each entry in the blocked-originator list (212) may be included in the blocked-originator list (212) itself, such that determining (402) a threat level for each entry in the blocked-originator list (212) may be carried out by inspecting a predetermined field in each entry that includes the threat level associated with the entry in the blocked-originator list (212). Readers will appreciate that such threat levels may be static values or dynamic values that are periodically recalculated as the nature of unwanted messages from a particular originator change.

In the example method depicted in FIG. 4, deleting (228) an entry from the blocked-originator list (212) in dependence upon entry removal rules (206) can also include deleting (404), by the list management module (204), an entry in the blocked-originator list with a lowest associated threat level. In such a way, the list management module (204) can ensure that the blocked-originator list (212) includes entries that are used to block incoming messages from those originators that present the greatest danger to the user and the user's system.

Figure 5:
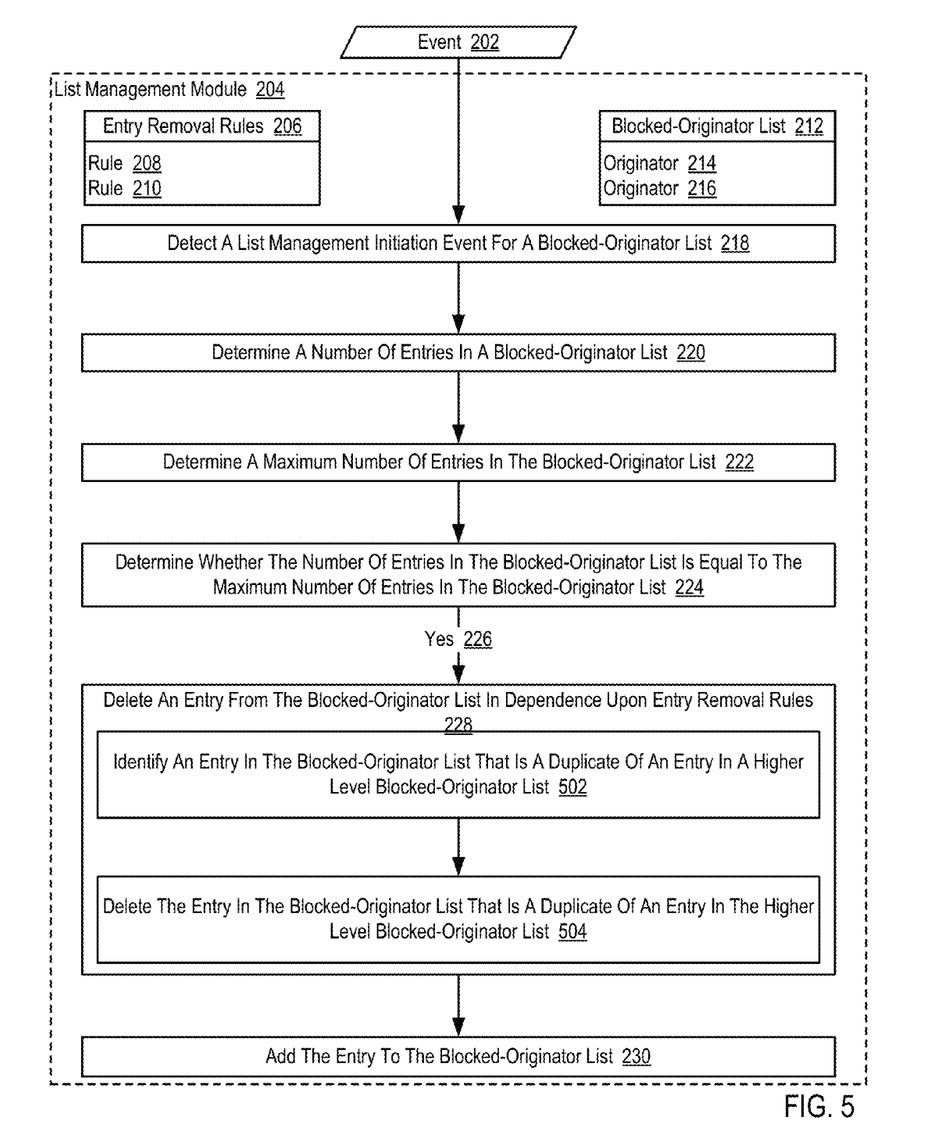
FIG. 5 sets forth a flow chart illustrating an additional example method for managing a blocked-originator list in a messaging application according to embodiments of the present invention.

For further explanation, FIG. 5 sets forth a flow chart illustrating an additional example method for managing a blocked-originator list (212) in a messaging application according to embodiments of the present invention. The example method depicted in FIG. 5 is similar to the example method depicted in FIG. 2, as it also includes detecting (218) a list management initiation event (202) for a blocked-originator list (212), determining (220) a number of entries in a blocked-originator list (212), determining (222) a maximum number of entries in the blocked-originator list (212), determining (224) whether the number of entries in the blocked-originator list (212) is equal to the maximum number of entries in the blocked-originator list (212), deleting (228) an entry from the blocked-originator list (212) in dependence upon entry removal rules (206), and adding (230) the new entry to the blocked-originator list (212).

In the example method depicted in FIG. 5, deleting (228) an entry from the blocked-originator list (212) in dependence upon entry removal rules (206) can include identifying (502), by the list management module (204), an entry in the blocked-originator list (212) that is a duplicate of an entry in a higher level blocked-originator list. In the example method of FIG. 5, a higher level blocked-originator list may be similar to the blocked-originator list (212) maintained by the list management module (204), except that the higher level blocked-originator list is maintained by another entity such as an incoming mail server, firewall application, and so on. Because maintaining redundant entries in the higher level blocked-originator list and the blocked-originator list (212) represents an inefficient use of resources, duplicated entries should be removed. In the example method of FIG. 5, identifying (502) an entry in the blocked-originator list (212) that is a duplicate of an entry in a higher level blocked-originator list may be carried out, for example, by the list management module (204) requesting the higher level blocked-originator list from another system resource and comparing the entries in the higher level blocked-originator list to the entries in the blocked-originator list (212) maintained by the list management module (204).

In the example method depicted in FIG. 5, deleting (228) an entry from the blocked-originator list (212) in dependence upon entry removal rules (206) can also include deleting (504), by the list management module (204), the entry in the blocked-originator list (212) that is a duplicate of an entry in the higher level blocked-originator list. In such a way, the list management module (204) can ensure that the blocked-originator list (212) includes only entries that are not included in the higher level blocked-originator list, thereby allowing for more efficient usage of the limited memory that is dedicated to maintaining the blocked-originator list (212).

While the examples depicted in FIGS. 3-5 describe embodiments in which deleting (228) an entry from the blocked-originator list (212) in dependence upon entry removal rules (206) includes deleting entries based on the frequency at which unwanted messages are received from an originator associated with a particular entry, the threat level associated with messages received from an originator associated with a particular entry, and the presence of a duplicate entry in a higher level blocked-originator list, readers will appreciate that any combination of such entry removal rules (206) may be utilized. For example, entries may be deleted (228) from the blocked-originator list (212) based on the frequency at which unwanted messages are received from an originator association with a particular entry, the threat level associated with messages received from an originator associated with a particular entry, and the presence of a duplicate entry in a higher level blocked-originator list, or any combination thereof. In such an example, such entry removal rules (206) may be designed so as to give a weighted preference to those entries with the highest frequency at which unwanted messages are received from an originator association with a particular entry, a weighted preference to those entries with a highest threat level associated with messages received from an originator associated with a particular entry, or a weighted preference to those entries with a duplicate entry in a higher level blocked-originator list.

Although the examples described above include only a single blocked-originator list (212), readers will appreciate that the list management module (204) or other component may also maintain a secondary blocked-originator list. For example, when a particular entry is removed from the blocked-originator list (212), that entry may be added to a secondary blocked-originator list. Such a secondary blocked-originator list may be used for many purposes such as for an automated comparison with other user lists, for mining by a third party for identification and assessment of spam patterns, for batch processing of a user's inbox (e.g., searching the user's inbox during low activity periods to identify messages in the user's inbox that are from an originator on the secondary blocked-originator list), and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ('RAM'), a read-only memory (ROM), an erasable programmable read-only memory ('EPROM' or 'Flash memory'), an optical fiber, a portable compact disc read-only memory ('CD-ROM'), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing a blocked-originator list for a messaging application, the method comprising:
    detecting, by a list management module stored in memory and executed by a computer microprocessor, a list management initiation event for a blocked-originator list, the blocked-originator list including a plurality of originators from which incoming messages are blocked;
    determining, by the list management module, whether a number of entries currently in the blocked-originator list is equal to a maximum number of allowable entries in the blocked-originator list; and
    responsive to determining that the number of entries currently in the blocked-originator list is equal to the maximum number of entries that may be included in the blocked-originator list:
        deleting, by the list management module, an entry from the blocked-originator list in dependence upon entry removal rules, including
            determining, by the list management module, a threat level for each entry in the blocked-originator list, wherein greater threats are associated with higher threat levels and lower threats are associated with lower threat levels;
            deleting, by the list management module, an entry in the blocked-originator list with the lowest associated threat level;
            identifying, by the list management module, an entry in the blocked-originator list that is a duplicate of an entry in a higher level blocked-originator list; and
            deleting, by the list management module, the entry in the blocked-originator list that is a duplicate of an entry in the higher level blocked-originator list, and
        adding, by the list management module, the new entry to the blocked-originator list.

2. The method of claim 1 wherein each originator is identified by an electronic mail ('email') address.

3. The method of claim 1 wherein deleting an entry from the blocked-originator list in dependence upon entry removal rules further comprises:
    identifying, by the list management module, each entry in the blocked-originator list that has been included in the blocked-originator list for at least a predetermined period of time;
    determining, by the list management module, a frequency at which an incoming message has been received from an originator contained in each identified entry in the blocked-originator list; and
    deleting, by the list management module, the entry in the blocked-originator list for which an incoming message has been least frequently received.

4. The method of claim 3 wherein determining the frequency at which an incoming message has been received from an originator contained in each identified entry in the blocked-originator list further comprises determining, by the list management module, a frequency at which an incoming message has been received from an originator contained in each identified entry in the blocked-originator list during a predetermined period of time.

5. An apparatus for managing a blocked-originator list for a messaging application, the apparatus comprising a computer processor, a computer memory operatively coupled to the computer processor, the computer memory having disposed within it computer program instructions that, when executed by the computer processor, cause the apparatus to carry out the steps of:
- detecting, by a list management module stored in memory and executed by a computer microprocessor, a list management initiation event for a blocked-originator list, the blocked-originator list including a plurality of originators from which incoming messages are blocked;
- determining, by the list management module, whether a number of entries currently in the blocked-originator list is equal to a maximum number of allowable entries in the blocked-originator list; and
- responsive to determining that the number of entries currently in the blocked-originator list is equal to the maximum number of entries that may be included in the blocked-originator list:
  - deleting, by the list management module, an entry from the blocked-originator list in dependence upon entry removal rules, including
    - determining, by the list management module, a threat level for each entry in the blocked-originator list, wherein greater threats are associated with higher threat levels and lower threats are associated with lower threat levels;
    - deleting, by the list management module, an entry in the blocked-originator list with the lowest associated threat level;
    - identifying, by the list management module, an entry in the blocked-originator list that is a duplicate of an entry in a higher level blocked-originator list; and
    - deleting, by the list management module, the entry in the blocked-originator list that is a duplicate of an entry in the higher level blocked-originator list, and
  - adding, by the list management module, the new entry to the blocked-originator list.

6. The apparatus of claim 5 wherein each originator is identified by an electronic mail ('email') address.

7. The apparatus of claim 5 wherein deleting an entry from the blocked-originator list in dependence upon entry removal rules further comprises:
- identifying, by the list management module, each entry in the blocked-originator list that has been included in the blocked-originator list for at least a predetermined period of time;
- determining, by the list management module, a frequency at which an incoming message has been received from an originator contained in each identified entry in the blocked-originator list; and
- deleting, by the list management module, the entry in the blocked-originator list for which an incoming message has been least frequently received.

8. The apparatus of claim 7 wherein determining the frequency at which an incoming message has been received from an originator contained in each identified entry in the blocked-originator list further comprises determining, by the list management module, a frequency at which an incoming message has been received from an originator contained in each identified entry in the blocked-originator list during a predetermined period of time.

9. A computer program product for managing a blocked-originator list for a messaging application, the computer program product disposed upon a computer readable storage medium, the computer program product comprising computer program instructions that, when executed, cause a computer to carry out the steps of:
- detecting, by a list management module stored in memory and executed by a computer microprocessor, a list management initiation event for a blocked-originator list, the blocked-originator list including a plurality of originators from which incoming messages are blocked;
- determining, by the list management module, whether a number of entries currently in the blocked-originator list is equal to a maximum number of allowable entries in the blocked-originator list; and
- responsive to determining that the number of entries currently in the blocked-originator list is equal to the maximum number of entries that may be included in the blocked-originator list:
  - deleting, by the list management module, an entry from the blocked-originator list in dependence upon entry removal rules, including
    - determining, by the list management module, a threat level for each entry in the blocked-originator list, wherein greater threats are associated with higher threat levels and lower threats are associated with lower threat levels;
    - deleting, by the list management module, an entry in the blocked-originator list with the lowest associated threat level;
    - identifying, by the list management module, an entry in the blocked-originator list that is a duplicate of an entry in a higher level blocked-originator list; and
    - deleting, by the list management module, the entry in the blocked-originator list that is a duplicate of an entry in the higher level blocked-originator list, and
  - adding, by the list management module, the new entry to the blocked-originator list.

10. The computer program product of claim 9 wherein each originator is identified by an electronic mail ('email') address.

11. The computer program product of claim 9 wherein deleting an entry from the blocked-originator list in dependence upon entry removal rules further comprises:
- identifying, by the list management module, each entry in the blocked-originator list that has been included in the blocked-originator list for at least a predetermined period of time;
- determining, by the list management module, a frequency at which an incoming message has been received from an originator contained in each identified entry in the blocked-originator list; and
- deleting, by the list management module, the entry in the blocked-originator list for which an incoming message has been least frequently received.

12. The computer program product of claim 11 wherein determining the frequency at which an incoming message has been received from an originator contained in each identified entry in the blocked-originator list further comprises determining, by the list management module, a frequency at which an incoming message has been received from an originator contained in each identified entry in the blocked-originator list during a predetermined period of time.

\* \* \* \* \*